United States Patent
Besse et al.

(10) Patent No.: US 9,890,261 B2
(45) Date of Patent: Feb. 13, 2018

(54) METHOD AND APPARATUS FOR COLOR REMOVAL FROM PET-FLAKE (SHREDDED PET)

(71) Applicant: Oxxynova GmbH, Steyerberg (DE)

(72) Inventors: Katharina Besse, Köln Poll (DE); Thomas Rieckmann, Kaufungen (DE); Samantha Walter, Köln (DE)

(73) Assignee: OXXYNOVA GMBH, Steyerberg (DE)

( * ) Notice: Subject to any disclaimer, the term of this patent is extended or adjusted under 35 U.S.C. 154(b) by 8 days.

(21) Appl. No.: 14/862,584

(22) Filed: Sep. 23, 2015

(65) Prior Publication Data

US 2016/0009893 A1    Jan. 14, 2016

Related U.S. Application Data

(63) Continuation of application No. PCT/EP2014/056053, filed on Mar. 26, 2014.

(30) Foreign Application Priority Data

Mar. 26, 2013 (EP) .................................. 13161194
Jun. 12, 2013 (EP) .................................. 13171754

(51) Int. Cl.
  *C08J 11/08* (2006.01)
  *C08J 11/24* (2006.01)
(52) U.S. Cl.
  CPC ............... *C08J 11/08* (2013.01); *C08J 11/24* (2013.01); *C08J 2367/02* (2013.01); *Y02W 30/701* (2015.05); *Y02W 30/706* (2015.05)
(58) Field of Classification Search
  CPC ........ C08J 11/08; C08J 11/24; C08J 2367/02; Y02W 30/701; Y02W 30/706; B01J 19/00
  USPC ........................... 521/40–49.5; 422/129, 273
  See application file for complete search history.

(56) References Cited

U.S. PATENT DOCUMENTS

2009/0133200 A1 * 5/2009 Mukai ................ B01D 11/0223
                                                                 8/440

FOREIGN PATENT DOCUMENTS

| CN | 101238171 A | 8/2008 |
|---|---|---|
| EP | 1914270 | 4/2008 |
| JP | 2001192492 | 7/2001 |
| JP | 2002327088 | 11/2002 |
| JP | 2004217871 | 8/2004 |
| JP | 2007045874 | 2/2007 |

OTHER PUBLICATIONS

Extended European Search Report in European Application No. 13 171 754.8 dated Sep. 5, 2013.
Communication pursuant to Article 94(3) EPC in European Application No. 13 171 754.8 dated Apr. 28, 2014.

(Continued)

*Primary Examiner* — Frances Tischler
(74) *Attorney, Agent, or Firm* — Norton Rose Fulbright US LLP

(57) ABSTRACT

Organic colorants incorporated in colored PET-flake, as being obtained by shredding PET bottles, can be extracted from the PET-flake by extracting the PET-flake with ethylene glycol (EG) at ambient pressure and at the boiling temperature of EG. Pre-treating of PET-flake in EG or other suitable organic compounds prior to extraction enhances the discoloration.

11 Claims, 2 Drawing Sheets

(56) References Cited

OTHER PUBLICATIONS

Response to Communication pursuant to Article 94(3) EPC in European Application No. 13 171 754.8 dated Apr. 28, 2014, filed Sep. 5, 2014.
Communication pursuant to Article 94(3) EPC in European Application No. 13 171 754.8 dated Sep. 30, 2014.
Response to Communication pursuant to Article 94(3) EPC in European Application No. 13 171 754.8 dated Sep. 30, 2014, filed Apr. 7, 2015.
Communication pursuant to Article 94(3) EPC in European Application No. 13 171 754.8 dated Apr. 24, 2015.
Response to Communication pursuant to Article 94(3) EPC in European Application No. 13 171 754.8 dated Apr. 24, 2015, filed Oct. 30, 2015.
Communication pursuant to Article 94(3) EPC in European Application No. 13 171 754.8 dated Dec. 1, 2015.
Result of Consultation in in European Application No. 13 171 754.8 dated Mar. 15, 2016.
Response to Communication pursuant to Article 94(3) EPC in European Application No. 13 171 754.8 dated Dec. 1, 2015, filed Apr. 8, 2016.
Communication pursuant to Article 94(3) EPC in European Application No. 13 171 754.8 dated Apr. 21, 2016.
Response to Communication pursuant to Article 94(3) EPC in European Application No. 13 171 754.8 dated Apr. 21, 2016, filed Aug. 9, 2016.
Communication under Rule 71(3) EPC in European Application No. 13 171 754.8 dated Oct. 11, 2016.
International Search Report and Written Opinion in International Application No. PCT/EP2014/056053 dated Apr. 16, 2014.

\* cited by examiner

METHOD AND APPARATUS FOR COLOR REMOVAL FROM PET-FLAKE (SHREDDED PET)

PRIORITY CLAIM

This application is a continuation of co-pending International Application No. PCT/EP2014/056053 filed on Mar. 26, 2014, which designates the United States and claims priority from European Application No. 13161194.9 filed on Mar. 26, 2013 and European Application No. 13171754.8 filed on Jun. 12, 2013, each of which is incorporated herein by reference in its entirety.

BACKGROUND OF THE INVENTION

1. Field of the Invention

The invention relates to a method and an apparatus for removing colorants from PET-flake which can be obtained by shredding commercially available used PET bottles.

2. Description of Relevant Art

PET is the common abbreviation for "polyethylene terephthalate" or more precisely "poly(ethylene terephthalate)" (CAS: 25038-59-9). PET is a thermoplastic polyester and widely used for food containers and bottles, e.g. for water, carbonated soft drinks, beer or the like. Pure PET is transparent for visible light with wavelengths between 380 nm and 780 nm and thus colorless. For aesthetic reasons and as well as to protect the liquids to be handled by PET bottles from degrading when subjected to light, the bottles are often colored by organic colorants and/or pigments.

Large amounts of used bottles are to be recycled. Various chemical recycling techniques are known, in particular glycolysis, methanolysis, hydrolysis, and saponification. However, according to the Petcore PET knowledge centre these methods are unable to remove colors from the PET feedstreams (www.petcore.org/content/processing of 2 May 2013)

EP 1 153 070 B1 suggests to contact PET with a glycol, e.g. ethylene glycol (briefly "EG") to thereby obtain oligomers and monomers of the PET, in particular bis-(2-hydroxyethyl) terephthalate (briefly "BHET", CAS: 959-26-2) in an agitated reactor vessel at a temperature of about 150° C. to 300° C. and an absolute pressure of 0.5 to 3.0 bars. The ratio of EG to dicarboxylic acid is greater than 1 to 5 total glycol units to total dicarboxylic acid units. Lower density contaminants form a distinct top layer in the reactor vessel and are separated from a lower layer containing a remainder of a glycolysis reaction mixture. Remaining immiscible contaminants are removed by filtration or straining.

PET bottle recycling is addressed by the European Patent EP 1 437 377 B1. First PET bottles are unpacked, steel and aluminum residues are removed and the bottles are shredded. Subsequently, non-PET polymers are separated by winnowing and float-sink separation. The such obtained PET-flake are depolymerized by charging them into EG at 175-190° C. at 0.1-0.5 MPa to thereby obtain BHET which is later subjected to an ester interchange reaction for forming crude dimethyl terephthalate (briefly "DMT", CAS: 120-61-6) and EG. DMT and EG can be separated, purified and again used as monomers in the polymer industry.

EP 1 914 270 suggest to recover colorants from dyed polyester fiber as used in PET-fabric by a dye extraction using ethylene glycol.

SUMMARY OF THE INVENTION

The invention is based on the observation, that the prior art methods for PET-recycling require transparent PET-flake or PET-flake of the same color i.e. include a color sorting step to obtain high quality recycling products.

The problem to be solved by the invention is to provide a method and apparatuses for the recycling of PET-flake without color sorting.

The method of the invention can be used for pre-processing PET-flake in particular prior to depolymerization. The PET-flake can be obtained for example by shredding PET bottles. PET-flake are preferably devoid of metal, paper and residues of beverages and other compounds previously stored in the bottles. This can be obtained by known prior art sorting and washing techniques, which are commercially available. The PET-flake may be of any color and may comprise a mixture of colors, e.g. brown PET-flake as well as blue, green, red, or black PET-flake.

The color removal process preferably comprises at least two process steps.

1) PET-flake are pre-treated in a hot organic liquid and (optional) and
2) Organic colorants are extracted from the PET-flake and the PET-flake are simultaneously embrittled using hot ethylene glycol (EG; IUPAC name: ethane-1,2-diol, CAS: 107-21-1).

Colorant extraction and simultaneous embrittlement of the PET-flake is obtained by contacting the PET-flake with preferably hot EG in a contacting vessel (step 2). Only for brevity this is subsequently summarized by referring only to "extraction". Extraction (and thus simultaneous embrittlement) is performed preferably at or slightly below the boiling temperature of EG (satp) at about ambient pressure. The extraction temperature $T_{ext}$ is preferably about 197.5° C. (192° C.$\leq T_{ext}\leq$205° C., preferably 195° C.$\leq T_{ext}\leq$200° C., more preferably 196° C.$\leq$Text$\leq$199° C., particularly preferred 197.0°$\leq T_{ext}\leq$197.6° C.) at preferably ambient pressure $p_a$ (typically 850 hPa$\leq p_a\leq$1100 hPa). The EG extracts the organic colorants and embrittles the PET-flake, however without significant depolymerization. There is no need to add a catalyst to embrittle the PET, because in commercially produced PET, as used for the bottles from which the PET-flake preferably origin, catalysts used for poly-condensation of the PET are embedded in the polymer matrix.

Below the 194.5° C. ($T_{ext}$<194.5° C.) the color removal slows down significantly. Above 200° C. ($T_{ext}$>200° C.) the PET-flake lose their form, get sticky and tend to form a mush with the EG, being is difficult to handle.

Preferably, the extraction step and as well the optional pre-treatment step are performed at least approximately at ambient pressure (+−200 hPa).

Preferably, used EG, i.e. EG loaded with organic colorants is preferably continuously removed from the PET-flake and/or at least from the extraction vessel, i.e. the contacting vessel, containing the PET-flake. Fresh, i.e. colorless or at least less loaded EG is added to the PET-flake, preferably continuously.

Extraction of the PET-flake is preferably completed once the PET-flake are colorless. "Colorless" or the degree of decolorization can be defined using a color analysis in the CIE L*, a*, b* color space (1976) defining a CIE LAB color difference $\Delta E$ being the Euklidic Norm of a vector defined by the triple (L*, a*, b*), i.e. $\Delta E^2 = (L^*)^2 + (a^*)^2 + (b^*)^2$. The mean color distance $\Delta E$ of the PET-flake when removing from the EG is preferably less or equal to 20, more preferably less or equal to 10.

Total depolymerization of the PET to BHET is avoided by the preferred temperature and pressure range and by limiting the contact time between PET and EG, respectively the residence time of PET under extraction conditions. The extraction process removes organic colorants from PET-flake. However, pigments like titanium dioxide ($TiO_2$, CAS: 13463-67-7) remain in the solid PET. These pigments migrate very slowly in the amorphous phase of solid-state PET and can be removed by an optional downstream depolymerization process of PET to DMT or any other PET monomer. The mechanism of organic colorants removal is still not fully understood. The working hypothesis is that the organic colorants are extracted from a preferably pretreated amorphous polymer matrix by molecular diffusion and film diffusion.

PET-flake embrittle in the course of the extraction process. This could be explained by a reduction of the degree of polymerization of PET-flake. However, PET-flake are not fully depolymerized to PET monomers during the extraction step. The degree of polymerizations (Pn) is solely reduced from initially typically 134 to a Pn of about 50 to 25. For example, treatment of bottle grade PET-flake in an EG counter-current flow for about 30 min at about 196° C. yielded embrittled PET-flake with an intrinsic viscosity of IV=0.30 dL/g, a molar mass of Mn=7300 g/mol, and a degree of polymerization of Pn=38. Further extraction treatment for another 30 min yielded PET-flake with an intrinsic viscosity of IV=0.25 dL/g, a molar mass of Mn=5800 g/mol, and a degree of polymerization of Pn=30.

The extraction is preferably completed as soon as the PET-flake are sufficiently decolorized as explained above. The time to obtain sufficient colorant extraction depends on the residence time, i.e. the time the PET-flake are in contact with EG, the flow velocity of the liquid EG, the flake particle size, flake particle shape and the temperature. Apart from sufficient colorant extraction, the process should preferably be completed before the flake soften. Criteria for completing the extraction step can in addition or alternatively to the degree of decolorization as defined above be an intrinsic viscosity of IV≤0.20 dL/g and/or a molar mass Mn≤4000 g/mol and/or a degree of polymerization Pn≤20 (±5).

Extracting the organic colorants is preferably obtained by conveying the PET-flake in a conveying direction and simultaneously contacting the PET-flake with liquid EG. In a preferred embodiment extraction is obtained by establishing a counter-current flow of EG directed against the PET conveying direction.

Such counter-current flow can be realized by conveying the PET-flake in a conveyor, e.g. a screw-conveyor, in a PET conveying or flow direction. Extraction liquid, i.e. liquid EG can be fed to the screw conveyor via an EG inlet downstream of the PET-flake inlet. The EG is removed from the screw conveyor upstream of the EG inlet. Thus, the EG flows in the opposite direction of the PET-flake flow, to which upstream and downstream refers. The EG flows through the voids of the PET-flake bulk. Such, the PET-flake and the EG are in close contact and the PET-flake are extracted by a counter-current flow of EG.

Preferably, the PET-flake are heated by heat transfer from condensing EG vapor while being extracted. In other words, at least a part of the EG being used for extraction of colorants from the PET-flake condenses from a gaseous phase into a liquid phase on the PET-flake and/or in already liquid EG. Such, the optimum temperature for colorant extraction can be obtained easily, which turned out to be only slightly below the boiling temperature of EG (197.3° C. at 1013 hPa). In other words, EG provided to the EG inlet or at least one of multiple EG inlets of the conveyor is at least partially in vapor phase and condenses in the conveyor. Additional heat can also be provided to the conveyor by heat transfer media at its shell or by electric heating devices via the shell or any other means.

Prior to extracting organic colorants from the PET-flake by contacting them with hot EG, the PET-flake are preferably pre-treated in a pre-treating liquid, referred to as pre-processing by pre-treatment. The pre-treatment liquid may at least comprise one of the following compounds: benzophenone ($C_{13}H_{10}O$, CAS: 119-61-9) and/or polyethylene glycol 600 ("PEG", $HO(C_2H_4O)_n$, CAS: 25322-68-3) and/or 1,2-dichlorobenzene ($C_6H_4Cl_2$, CAS: 95-50-1) and/or limonene ($C_{10}H_{16}$, CAS: 5989-27-5) and/or 1,4-dioxane ($C_4H_8O_2$, CAS: 123-91-1) and/or ethylene glycol ($C_2H_6O_2$, CAS: 107-21-1) and/or triethylene glycol ("TEG", $C_6H_{14}O_4$, CAS: 112-27-6) and/or tetraethylene glycol ($C_8H_{18}O_5$, CAS: 112-60-7) and/or methanol ($CH_4O$, CAS: 67-56-1). In a particular preferred embodiment the pre-treatment liquid is ethylene glycol ("EG").

During the pre-treatment step the PET-flake are brought in close contact with the pre-treatment liquid. For example, the PET-flake can be immersed in a pre-treatment vessel containing the pre-treatment liquid The pre-treatment temperature $T_{pre}$ should be above the glass transition temperature ($T_{gl}$) of the PET-flake and below the melting temperature ($T_{melt}$) of the PET-flake. The glass transition temperature together with the melting point of the bottle grade PET-flake differs with the PET-flake and depends on the PET specification (i.e. the kind and amount of PET co-monomers). A typical glass transition temperature of "bottle grade PET" is about 80° C. (±5 K). The melting temperature of "bottle grade PET" is about 240° C. to 255° C. More preferably, the pre-treatment temperature $T_{pre}$ is below the temperature where significant softening of the PET-flake can be observed ($T_{soft}$), to thereby avoid that the PET-flake get "sticky" and agglomerate while pre-treated. This happens typically above 220° C. (±5 K). Briefly summarizing, the pre-treatment temperature interval can be chosen as $T_{gl} \leq T_{pre} \leq T_{melt}$, more preferred $T_{gl} \leq T_{pre} \leq T_{soft}$. Typical values for $T_{pre}$ are between 120° C. and 180° C. It has been observed that the PET-flake shrink and the wall thickness increases while pre-treated. It was shown experimentally that the PET relaxes above the glass transition temperature. However, almost no or at least no significant depolymerization has been observed while pre-treating the PET-flake. As well no or at least no significant color extraction and no measurable embrittlement can be observed during the pre-treatment step (step 1). However, surprisingly the pre-treatment step enhances subsequent color extraction in step 2.

The mass ratio of PET-flake to liquid for pre-treating PET-flake in e.g. EG is preferably at least about 1:2 (possible 1:1 to 1:5). A pre-treatment vessel may be used to immerse the PET-flake in the pre-treatment liquid, e.g. EG. The pre-treatment vessel may be heated to $T_{pre}$ with $T_{gl} \leq T_{pre} \leq T_{melt}$, and may preferably have a thermal insulation layer. A blanket of gaseous nitrogen ($N_2$) may be used on top of the pre-treatment liquid/PET-flake slurry to avoid contamination of the PET-flake with moisture and/or oxygen. Agitation, e.g. by stirring is preferred. A condenser e.g. on top of and/or above the pre-treatment vessel may be used to recover condensable components (e.g. EG and water from moist PET). Non-condensable components may be removed and e.g. burnt. The pre-treatment liquid can be provided, preferably continuously to the pre-treatment vessel, e.g. via a tube. The tube's outlet is preferably below the fluid level in the pre-treatment vessel. The pre-treatment liquid can be removed, preferably continuously from the pre-treatment vessel for example by an over-flow. A mesh may ensure that the PET-flake remain in the pre-treatment vessel. The PET-flake can be removed using a conveyor means, e.g. a screw conveyor with its lower end inside the pre-treatment vessel.

The pre-treatment has two advantages: firstly, the PET is dried. PET is hygroscopic and PET-flake being subjected to ambient air have typical moisture (water, $H_2O$) content of up to 10,000 ppm by weight (typically 3000 ppm to 6000 ppm) and already small amounts of water may affect the boiling temperature of the extracting liquid and thus have an impact on extracting temperature Text. Secondly, the subsequent colorant extraction is enhanced. It is assumed that pre-treating the PET-flake somehow affects the amorphous part of the solid PET matrix by a kind of "swelling" effect. However, a profound microscopic understanding is still missing. During the pre-treatment step only minor color extraction is noticed.

The pre-treatment time $t_{pre}$ depends on the pre-treatment liquid and the pre-treatment temperature $T_{pre}$. In case of pre-treatment in EG with, e.g. $T_{pre}$=130° C., good results have been obtained with a residence time of $t_{pre}$=60 min (±15 min). A higher pre-treatment temperature requires a lower residence time, but a non-linear relation between temperature and time is noticed.

An apparatus for extracting organic colorants from PET-flake preferably comprises a conveyor as extracting vessel for conveying a flow of PET-flake from a PET-flake inlet in a conveying direction to a PET-flake outlet. The conveyor can be for example a screw-conveyor with a screw housing and a conveyor screw for conveying PET-flake via the screw housing from at least one PET-flake inlet in a PET conveying direction to at least one PET-flake outlet. The conveyor has at least one EG inlet, i.e. an extraction liquid inlet in the screw housing. The EG inlet is downstream of said PET-flake inlet. At least one EG outlet, i.e. an extraction fluid outlet is upstream of the EG inlet for providing a counter-current flow. "Upstream" and "downstream" refer to the PET flow, i.e. the PET conveying direction. The apparatus may be used in particular for pre-processing PET-flake prior to depolymerization of PET-flake with an extraction fluid, in particular EG.

For example, the counter-current EG flow in opposite direction to the PET-flake flow can be obtained if the PET conveying direction is inclined against the horizontal or in other words sloped (including a vertical PET-flake conveying direction). In this case the extraction fluid pours or flows downwards in the conveyor through voids between the PET-flake, whereas the PET-flake are conveyed upwards. In the above example of the screw-conveyor, the screw axis may be sloped. However, the invention is not restricted to this possible arrangement. The EG can of course be provided to the extraction vessel at its lower end and removed at the top, while the PET-flake are conveyed in the opposite direction.

The apparatus may further comprise at least one EG vapor source being connected to the screw housing for providing gaseous EG, i.e. EG vapor, to the screw housing.

The conveyor housing may comprise at least one condenser, for example being attached to its screw housing. This arrangement ensures that vapor from the extraction apparatus (which consists at least mainly of EG) is condensed, thus ensuring ambient (or slightly above ambient) pressure in the extraction apparatus.

Preferably, the condensing chamber has at least one drain for removing condensed EG vapor, i.e. liquid EG. The drain may be connected to at least one extraction fluid-inlet of the screw housing and/or at least one vapor generator for providing a liquid to said at least one vapor generator.

Preferably, the apparatus further comprises at least a pre-treatment vessel for immersing PET-flake in one of the above specified a pre-treatment liquids at a temperature $T_{pre}$ of $T_{gl} \leq T_{pre} \leq T_{soft}$. Such immersing is subsequently referred to as pre-treatment (optional step 1). Thus, the pre-treatment vessel and/or pre-treatment liquid (e.g. EG) is preferably heated. The pre-treatment vessel contains the pre-treatment liquid. By pre-treating the PET-flake e.g. in liquid EG, water can be removed from the PET. Further, pre-treatment enhances color extraction in the second step as explained above. In the pre-treatment step no significant color extraction or embrittlement is observed. The color of the pre-treatment liquid remains almost unchanged.

If the pre-treatment vessel comprises a PET strainer for removing PET from the pre-treatment vessel and feeding the PET-flake inlet of the screw conveyor, handling of large amounts of PET-flake is facilitated.

The pre-treatment vessel has been explained above with respect to EG as pre-treatment liquid. However, the other above cited pre-treatment liquids may as well be used for pre-treatment of PET-flake, e.g. in said pre-treatment vessel.

Preferably, the apparatus further comprises a rectification apparatus for rectifying liquid EG drained at the screw-conveyor's EG outlet to thereby obtain a colorless fraction and an a fraction comprising organic colorants and other high boiling residues. The colorless fraction may be reused for pre-treating and extracting PET-flake.

Only for clarity, the term "PET-flake" denotes the singular and the plural, i.e. a single PET-flake as well as a multitude of PET-flake. In an industrial scale process, only the plural is relevant. The terms extractions vessel and contacting vessel are used interchangeably throughout this application, as the color extraction and PET-flake embrittlement is obtained by contacting the PET-flake with hot EG. The pre-treatment vessel for immersing the PET-flake prior to the extraction step could thus as well be referred to as immersing vessel.

BRIEF DESCRIPTION OF THE DRAWINGS

In the following, the invention will be described by way of example, without limitation of the general inventive concept, on examples of embodiment and with reference to the drawings.

Figure 1:
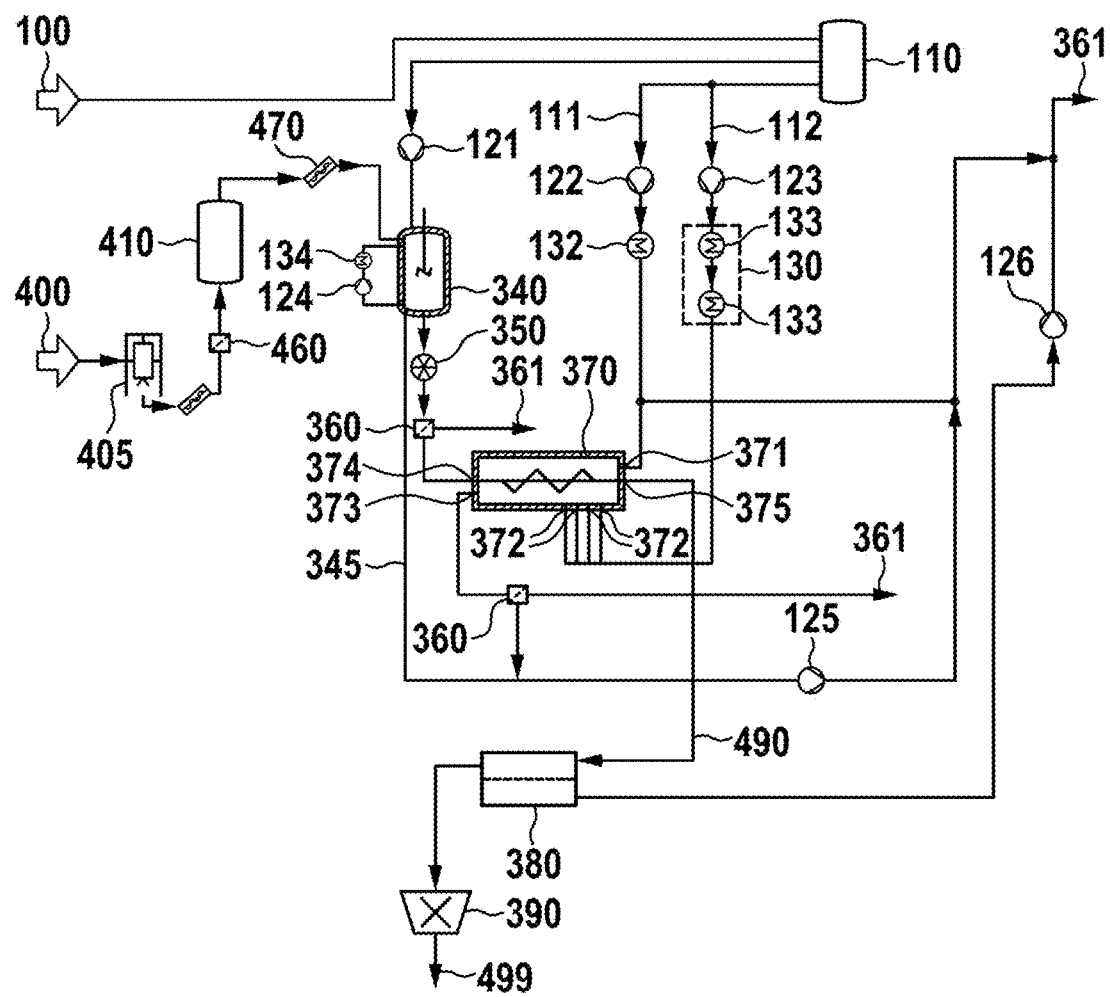
FIG. 1 shows a process flow diagram of a method for extracting organic colorants from colored PET-flake.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

According to the flow diagram shown as FIG. 1, PET-flake are supplied by PET-flake supply 400. The PET-flake are typically provided in so called bigbags and thus unpacked as indicated by reference numeral 405. Subsequently, the PET-flake may pass an optional separator 460 for removing foreign material or PET-flake with a size out of a given specification and stored in a PET-flake reservoir 410. The PET-flake reservoir 410 is a PET-flake source for the pre-processing PET-flake. Other bulk transport means can as well be used for providing the PET-flake. Required is only a preferable continuous PET-flake stream to the pre-treatment vessel 340.

In this example, PET-flake from a PET-flake source, i.e. reservoir 410, are supplied to a pre-treatment vessel 340. In the pre-treatment vessel 340 the PET-flake are immersed in EG. EG is preferably continuously provided from an EG-source, in this case an EG-reservoir 110. The EG is heated to a pre-treatment temperature $T_{pre}$ of typically 150° C. (preferred: $T_{gl} \leq T_{pre} \leq T_{soft}$). For heating the EG, EG is pumped from the pre-treatment vessel 340 by pump 124, fed to a heater 134 and fed back to the pre-treatment vessel 340. Other possibilities for obtaining the required temperature are as well suitable, for example an electrical pre-treatment vessel heating. EG is removed from the pre-treatment vessel, e.g. continuously via line 345 and may be provided to an EG treatment device, e.g. a filtration and/or rectification unit. Purified EG may be used again, e.g. by providing it to the EG reservoir 110.

Pre-treated PET-flake are drained from the pre-treatment vessel and transported via a separator 360 to an extraction vessel 370. Transporting may be obtained e.g. by use of a rotary feeder 350. Most EG may be removed from the PET-flake flow using the separator 360 and then fed to a PET-flake inlet 374 of a conveyor 370 used as extraction vessel. For example, a screw-conveyer as shown in FIG. 2 may be used as extraction vessel 370.

In the screw conveyor 370, the PET-flake are conveyed by rotation of the screw from the PET-flake inlet 374 to a PET-flake outlet 375. EG is provided in a counter-current flow (with respect to the PET-flake flow) to the conveyor. EG is provided from the reservoir 110 and may be split in two lines: In a first line 111 the EG is heated using a first heater 132 and fed as liquid EG to the downstream end of the conveyor. The temperature $T_l$ of the liquid EG provided to the extraction vessel should be adjusted to the extraction temperature $T_{ext}$, i.e. to: 195° C. $\leq T_l = T_{ext} \leq T_{boil}$ preferably to $T_{ext} = 196 \pm 1$° C., where $T_{boil}$ stands for the boiling temperature of the EG. In the second line 112, the EG is vaporized at least partially by an EG-vapor generator 130, symbolized by two heaters 133; the number of heaters 133 is of course not essential, nor the energy source for heating the EG. The vaporized EG, i.e. gaseous EG is as well fed downstream of the PET-flake inlet to the conveyor. The gaseous EG thereby heats the PET-flake by condensation preferably to about 197° C., i.e. just below the boiling temperature of EG at ambient pressure. At the upstream end of the conveyor is an EG outlet from which EG is removed to thereby obtain a counter-current flow of EG and PET-flake. The removed EG can be provided to an EG treatment (indicated by arrow 361) for purification and reuse.

Organic colorants are extracted from the PET-flake in the conveyor 370 by contacting the PET-flake with a counter-current EG flow. The PET-flake are preferably at least almost colorless when leaving the conveyor 370 via the PET-flake outlet 375. The PET-flake are not only at least almost colorless but as well brittle after passing the conveyor 370. EG leaving the conveyor via the PET-flake outlet 375 can be separated using a strainer 380. PET-flake from the outlet 375 can be further processed, e.g. by milling. The colorless brittle PET-flake (line 490) can be subjected to depolymerization, e.g. by methanolysis as indicated by arrow 499.

Figure 2:
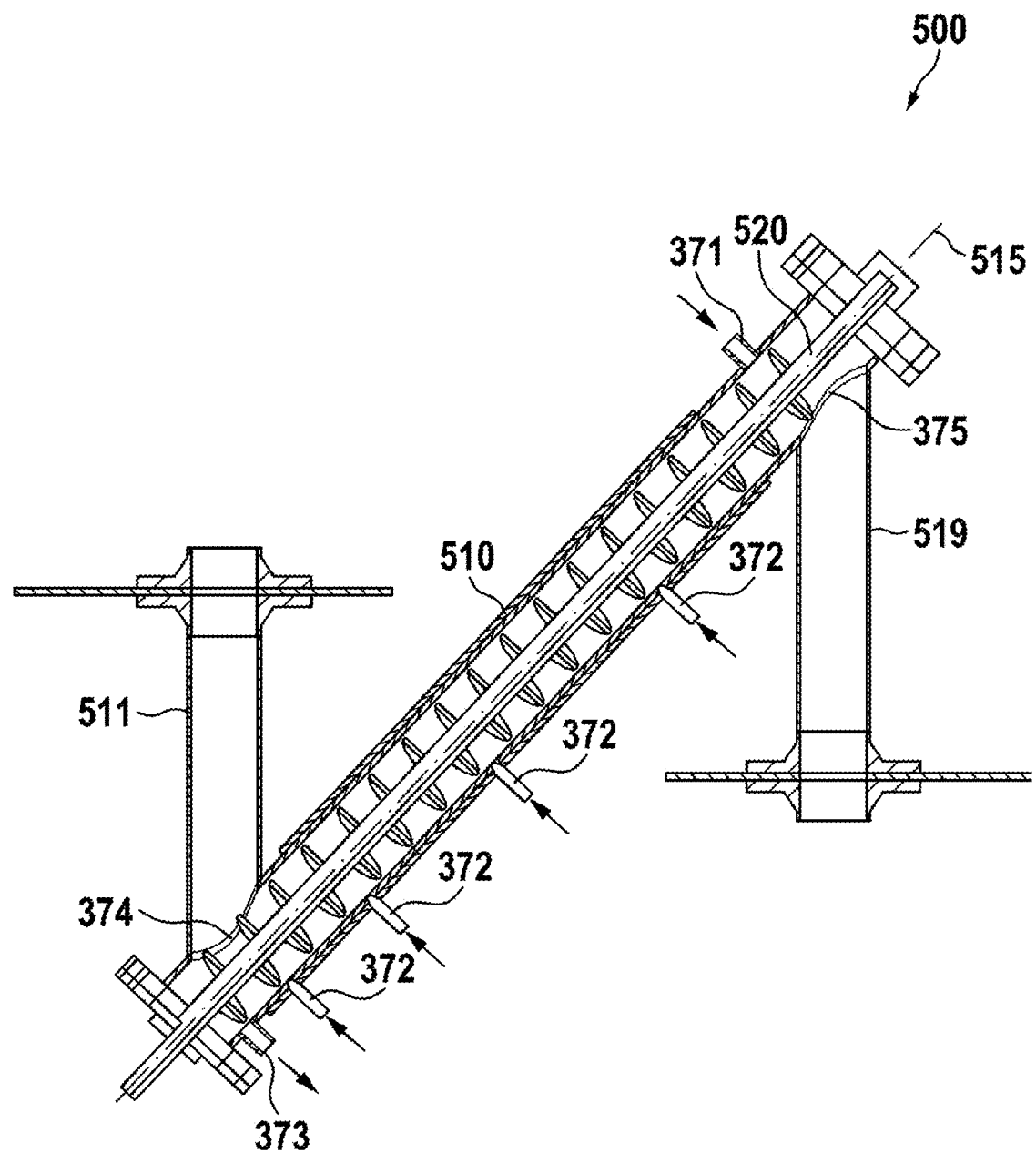
FIG. 2 shows an apparatus for extracting PET-flake with hot EG.

FIG. 2 shows a simplified screw-conveyor 500 for pre-processing PET-flake, in particular for extracting organic colorants from PET-flake. In other words, the screw conveyor is a possible extraction vessel for extracting organic colorants from PET-flake while simultaneously obtaining an embrittlement of the PET-flake, as referred to as step 2. In particular, the screw-conveyor as shown in FIG. 2 can be used as conveyor 370 in the scheme of FIG. 1. The screw-conveyor 500 has a tubular screw housing 510, the latter housing a conveyor screw 520, briefly referred to as screw 520. The screw 520 is preferably motor driven. The longitudinal axis 515 of the screw 520 and accordingly as well of the screw housing 510 is sloped. The screw housing 510 has a PET-flake inlet 374, being connected to a down pipe 511 for feeding PET-flake to the PET-flake inlet 374. The down pipe 511 is optional. The screw 520 conveys the PET-flake to a PET-flake outlet 375 at the upper end of the screw housing 510. A further optional down pipe 519 is attached to PET-flake outlet. The screw housing 510 has nozzles 530 as EG inlets 372 for injecting vaporous EG into the screw housing and thereby heating the PET-flake to a temperature slightly below the boiling temperature of EG. The vaporous EG thus condenses inside the screw housing. The condensed, i.e. liquid, EG flows downwards through the voids in the PET-flake bulk to an EG outlet 373. At the EG outlet 373 the EG is removed from the screw-conveyor. In addition to the vaporous/gaseous EG, liquid EG may as well be injected into the screw housing 510 for example via EG inlet 371. The temperature in the conveyor can thus be adjusted by adjusting the amount of EG vapor provided to the extraction vessel. For better control of the temperature, the crew conveyor may have an additional shell for heat transfer by a heat transfer medium and/or other heating means like an electrical heater.

It will be appreciated to those skilled in the art having the benefit of this disclosure that this invention is believed to provide a method and an apparatus for decolorizing PET. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS

100 EG supply
110 EG reservoir/EG source
121 pump
122 pump
123 pump
124 pump
125 pump
126 pump
130 steam generator 132 heater
133 heater
134 heater
340 pre-treatment vessel/immersing vessel
350 feeder (e.g. star feeder)
360 separator
361 to EG treatment (e.g. filtration and/or rectification)
370 conveyor (screw conveyor)/contacting vessel/extraction vessel
371 liquid extraction fluid inlet/EG inlet (fluid)
372 EG inlet (gaseous)
373 extraction fluid outlet/EG outlet (liquid)
374 PET-flake inlet
375 PET-flake outlet
400 PET-flake supply
405 unpacking station
410 PET-flake reservoir/PET-flake source
460 separator
470 transport means
490 decolorized brittle PET-flake line
499 to depolymerization facility
500 screw conveyor/contacting vessel/extraction vessel
510 screw housing
511 downpipe, PET-flake feed
519 downpipe, brittle PET-flake outlet
515 longitudinal axis of the screw 520 and the screw housing 510
520 conveyor screw
530 nozzle

The invention claimed is:

1. Method for pre-processing PET-flakes prior to depolymerization by glycolysis, methanolysis, hydrolysis, saponification, and/or any combination of these PET depolymerization processes, the method comprising:
   pretreating the PET flakes by immersing the PET flakes, in a pretreatment vessel, in an liquid organic solvent comprising at least one compound selected from the group consisting of: polyethylene glycol, ethylene glycol, triethylene glycol, and/or tetraethylene glycol, wherein the color of the pretreated PET flakes remains substantially the same;
   removing the colored pretreated PET from the pretreatment vessel;
   extracting organic colorants from the colored pretreated PET-flakes and simultaneous embrittlement of the pretreated PET-flakes by:
   contacting the pretreated PET-flakes with vaporized ethylene glycol in a contacting vessel at an extraction temperature $T_{ext}$ of between 192° C. and 205° C. (192° C.$\leq T_{ext} \leq$205° C.), and
   removing used ethylene glycol from the contacting vessel and adding fresh ethylene glycol to the contacting vessel.

2. Method of claim 1, wherein the pretreated PET-flakes are contacted with the ethylene glycol at ambient pressure.

3. Method of claim 1, wherein said extracting of organic colorants is stopped if the color extracted PET-flakes show at least one property selected from the group consisting of:
   an intrinsic viscosity IV<0.20 dL/g;
   a molar mass Mn with 3000 g/mol$\leq$Mn$\leq$8000 g/mol; and
   a degree of polymerization Pn<20.

4. Method of claim 1, further comprising conveying the pre-treated PET-flakes in a PET conveying direction and simultaneously contacting the pre-treated PET-flakes with vaporized ethylene glycol.

5. Method of claim 4, wherein the pre-treated PET-flakes are contacted with a counter flow of vaporized ethylene glycol being directed against the PET conveying direction.

6. Method of claim 4, where the contacting vessel comprises a screw conveyor, and the extracting step comprises establishing a counter flow of vaporized ethylene glycol in the screw conveyor.

7. Method of claim 1, further comprising heating the pre-treated PET-flakes in the contacting vessel by heat transfer from ethylene glycol vapor as it condenses to liquid ethylene glycol.

8. Method of claim 1, wherein the extracting step occurs at an extraction temperature $T_{ext}$ of between 195° C. and 200° C. (195° C.$\leq T_{ext} \leq$200° C.).

9. Method of claim 8, wherein the extracting step occurs at an extraction temperature $T_{ext}$ of between 196° C. and 199° C. (196° C.$\leq T_{ext} \leq$199° C.).

10. Method of claim 9, wherein the extracting step occurs at an extraction temperature $T_{ext}$ of between 197.0° C. and 197.6° C. (197.0° C.$\leq T_{ext} \leq$197.6° C.) at ambient pressure $p_a$ (±200 hPa).

11. Method of claim 1, wherein a temperature $T_{pre}$ of the organic solvent while immersing the untreated PET-flakes is above a glass transition temperature $T_{gl}$ of the PET-flakes and below a melting point temperature $T_{melt}$ of the PET-flake ($T_{gl} \leq T_{pre} \leq T_{melt}$).

* * * * *